April 15, 1941.  W. R. PERRY  2,238,435

BEARING BUSHING

Filed Aug. 17, 1938

INVENTOR.
William R. Perry,
BY
Hood & Hahn.
ATTORNEYS.

Patented Apr. 15, 1941

2,238,435

UNITED STATES PATENT OFFICE 2,238,435

BEARING BUSHING

William R. Perry, Columbus, Ind., assignor to Reeves Pulley Company, Columbus, Ind., a corporation of Indiana Application August 17, 1938, Serial No. 225,301

1 Claim. (Cl. 287—52)

The present invention relates to a bearing bushing primarily intended to eliminate erosion between a shaft and a bearing associated therewith with a snug fit.

It is essential, in some mechanical organizations, that a shaft be so mounted in its bearings that it may be withdrawn therefrom, or that the bearings may be removed from the shaft, with some degree of facility. This means that the fit of the bearing on the shaft must be sufficiently loose so that, without the use of expensive equipment, the two elements may be separated. It is notoriously true that, unless a bearing is associated with a shaft with a tapered or press fit, extended use of the organization will result in erosion between the bearing and the shaft. Obviously, a press fit cannot be used if the organization is of such character that the ultimate user of the machine must be able to withdraw the shaft from the bearings, or to remove the bearing from the shaft.

This erosion is believed to be due primarily to the fact that loading of the shaft causes it to bear tightly against one point of the inner surface of the bearing race, thereby leaving a very loose fit at a diametrically opposite point. As the shaft and inner race rotate, this loading of the shaft causes the shaft to roll on the inner surface of the race. Likewise, because of the small areas of high pressure between the shaft and bearing race, and because there is insufficient relative movement therebetween properly to spread any lubricant film therebetween, any such lubricant film is readily ruptured by the rolling or percussive action between the shaft and bearing race. These actions may ultimately scrape a minute piece of metal from the surface of the shaft, or from the internal surface of the bearing element. After such a piece has once been loosened, further rolling movement between the two elements will cause that particle to act as an abrasive to cut still further fragments from the cooperating surfaces. After extended periods of use, it is frequently noted that the shaft has been relatively deeply cut. Of course, such cutting results in further loosening of the fit between the shaft and the bearing element and ultimately will cause audible pounding of the shaft in the bearing.

It is the primary object of the present invention to provide means for preventing that action. In essence, the invention contemplates the provision of a confined lubricant between the shaft and the bearing element, the lubricant being highly viscous, resiliently flowable, and of such character as to tend to adhere to the surface of the shaft and to the internal surface of the bearing element, whereby relative movement between the shaft and the bearing element is entirely absorbed by internal flow within the body of the lubricant.

It will be clear that the material used must be such that it will not be deleteriously affected by water or oil, must be relatively readily deformable, and must be of such character as to be relatively unaffected by fatigue. These requisites of course eliminate rubber from acceptance as a satisfactory material.

I have found that the above requisites are all fulfilled by the vulcanized material produced by numerous manufacturers from the polymerized chloroprene commercially known as "Neoprene" offered on the open market by the Rubber Chemicals Division of E. I. du Pont de Nemours & Company, Inc. of Wilmington, Delaware. Numerous advantages flow from the interposition, between a shaft and a bearing associated therewith, of a bushing formed of this vulcanized material.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claim is not violated.

Figure 1:
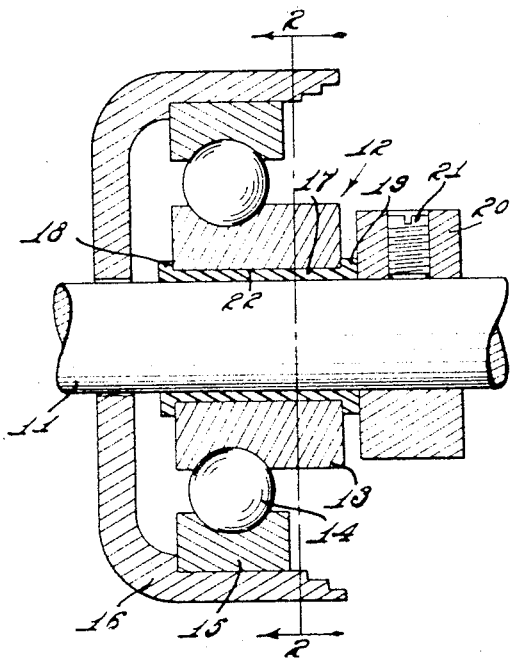
Fig. 1 is a substantially central longitudinal section through an assembled shaft and bearing with which such a bushing is associated.
Figure 2:
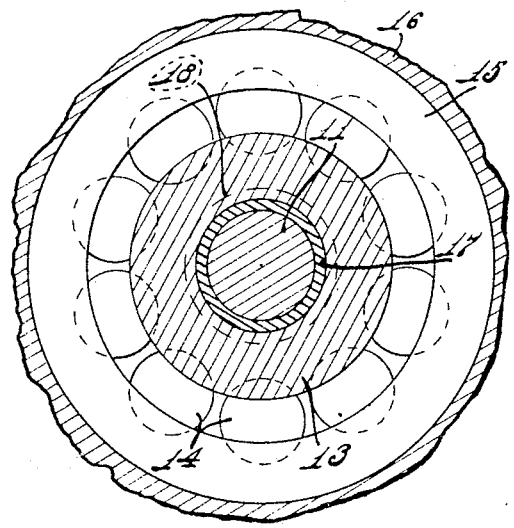
Fig. 2 is a transverse section taken substantially on the line 2—2 of Fig. 1 and looking in the direction of the arrows.

Referring more particularly to the drawing, it will be seen that I have illustrated a shaft 11 upon which is mounted a ball bearing indicated generally by the reference numeral 12 and comprising an inner race 13, a series of balls 14, and an outer race 15 carried in a cage or bearing housing 16.

Interposed between the shaft 11 and the inner bearing race 13 is a bushing 17 formed of a vulcanized product of "Neoprene" and shaped to provide radial flanges 18 and 19 at its opposite ends, projecting beyond the ends of the aperture 22 in the inner bearing race 13.

In the illustrated organization, a stop collar 20 is secured to the shaft 11 by means of a set screw 21 to limit relative axial movement between the shaft and the bearing.

The vulcanized product of "Neoprene" has a relatively high coefficient of friction, and therefore tends to adhere to the surfaces of the shaft 11 and the bearing race 13 with which it is in contact; so that relative movements between said shaft and said bearing race are absorbed by internal flow of the "Neoprene" within the body of the bushing 17.

Figure 3:
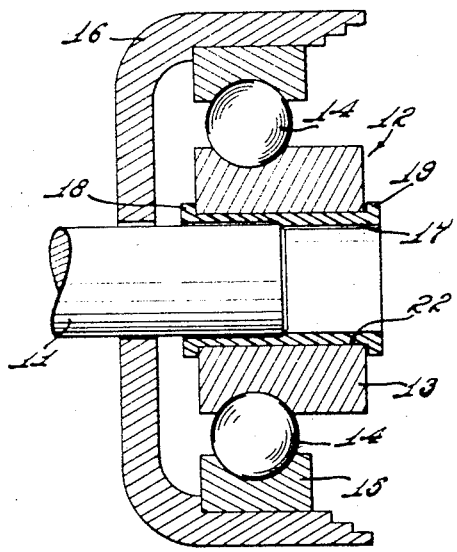
Fig. 3 is a section similar to Fig. 1 but showing the manner in which the bearing assembly may be associated with the shaft.

Preferably, the bushing 17 is formed with a normal internal diameter slightly less than the external diameter of the shaft 11 with which it is to be associated; and it may be provided with radially extending flanges at one or both ends. The bushing being assembled in the aperture 22 of the bearing race 13 the assembly is pressed against the end of the shaft 11. Since the "Neoprene" bushing is readily deformable, such pressure will tend, in view of the fact that the flange 18 holds the left hand end of the bushing against movement with respect to the bearing race 13, to force the remainder of the bushing to move toward the right, by stretching. Such stretching results in attenuation of that portion of the bushing which is held against movement with respect to the bearing race, whereby the internal diameter of the bushing is increased, so that it will move relatively freely over the surface of the shaft 11. As the bearing race and bushing are moved toward the left as viewed in Fig. 3, the above-mentioned attenuation progressively advances in the manner illustrated in Fig. 3, whereby assembly of the bearing race and bushing with the shaft is materially facilitated. When the assembling pressure upon the bearing race is withdrawn, the bushing tends to resume its normal condition, by inherent elasticity, whereby the attenuation of the bushing is decreased and the bushing is caused to grip the shaft under elastic tension.

Obviously, removal of the bearing from the shaft results in an opposite effect upon the bushing, attenuating the bushing in the above-described manner and causing the flange 18 to move slightly away from the left hand end of the bearing race 13.

Tests have shown that, when a bearing, or the like, is assembled with a shaft with the interposed bushing of vulcanized "Neoprene," as disclosed in the present application, the organization may be subjected to long periods of use without damage to the shaft or to the bearing. The bushing absolutely prevents the above-described erosion, acts as a lubricant between the two metal elements, and absorbs relative movements within itself without materially deleterious effects even upon the bushing.

Obviously, the bushing of the present application is not by any means limited to use between a shaft and its bearing; but may be interposed between any two elements which are intended to be relatively substantially stationary, but between which minute movements unavoidably occur. A few examples of such further applications of the present invention, which are intended to be illustrative and not limitative are: Between a shaft and a fly wheel, pulley element, pulley, gear, sprocket, propeller, or the like, mounted thereon.

I claim as my invention:

The combination with a shaft and an element to be supported thereon and provided with an apertured hub, of a bushing received within the hub aperture and projecting from both ends thereof, and means for holding the projecting ends of said bushing against movement inwardly of said hub aperture, said bushing being formed of readily deformable elastic material and having a normal internal diameter less than the external diameter of said shaft.

WILLIAM R. PERRY.